Patented Jan. 4, 1938

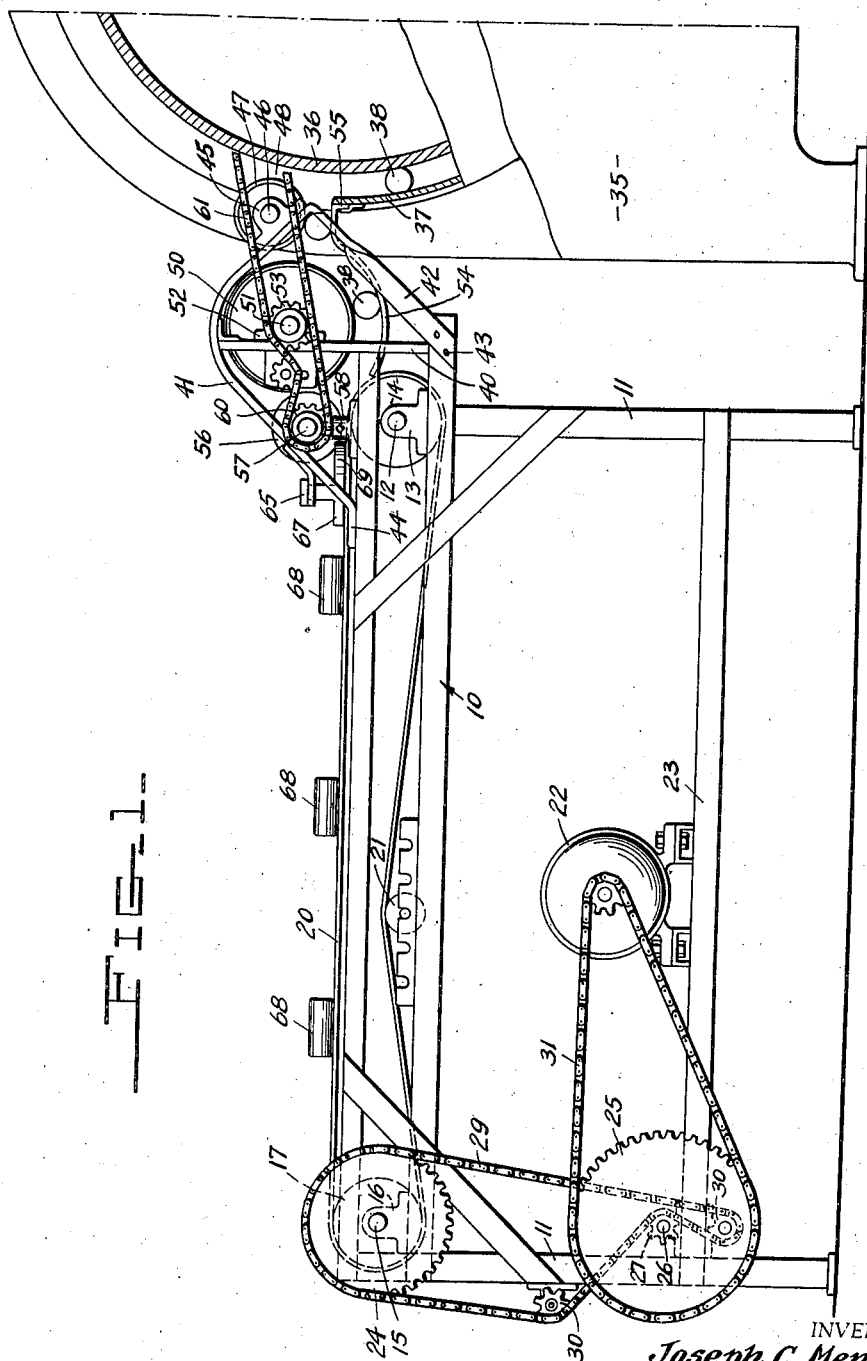

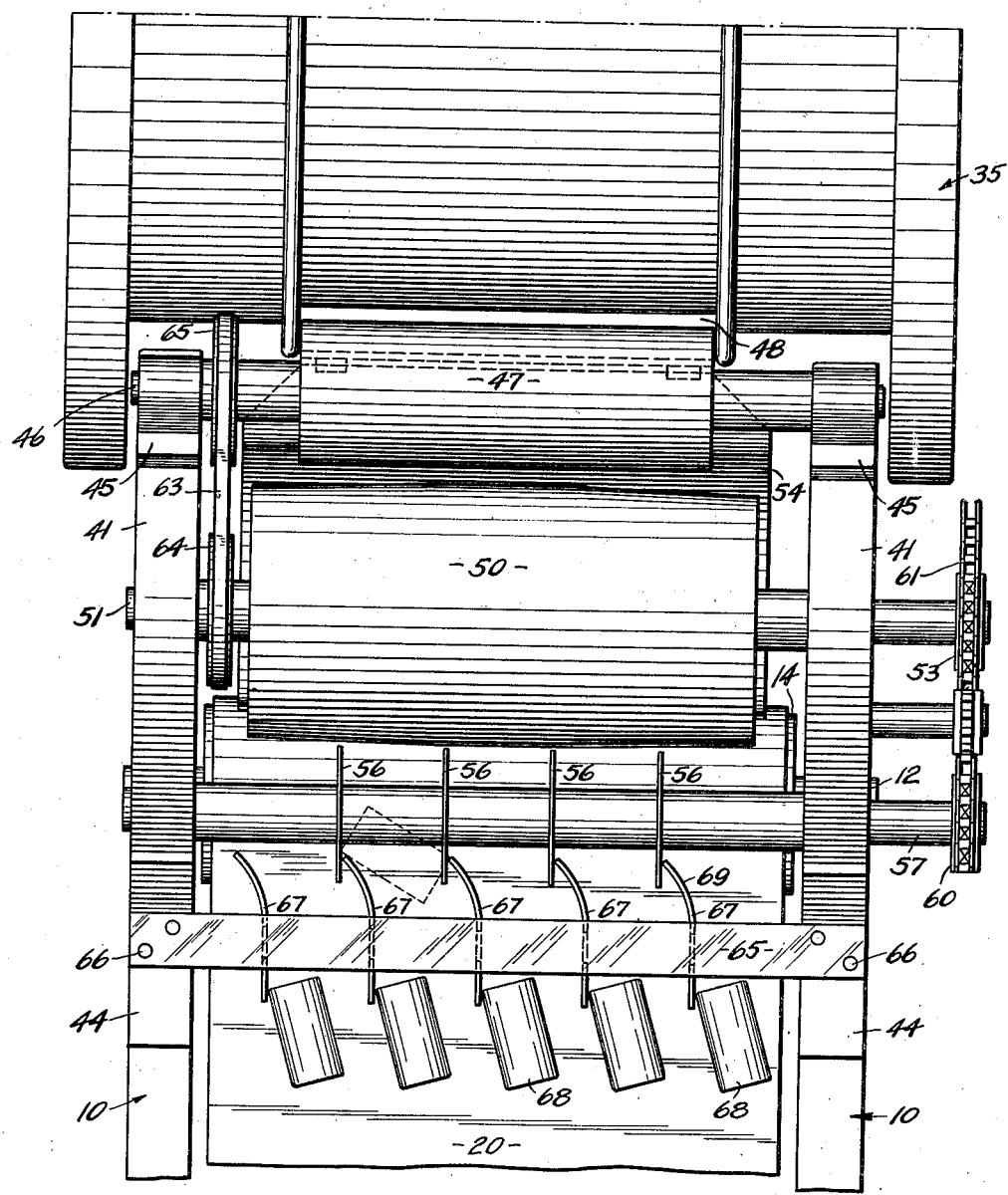

2,104,205

UNITED STATES PATENT OFFICE 2,104,205

DOUGH DIVIDER

Joseph C. Menapace and George Kallfelz, Syracuse, N. Y.

Application August 28, 1935, Serial No. 38,252

6 Claims. (Cl. 107—22)

This invention relates to a machine for automatically dividing a piece of dough into a plurality of smaller pieces, and at the same time effecting a predetermined relative arrangement of the severed pieces.

It is believed by many engaged in the baking industry that a finer texture may be obtained in a loaf of bread when the piece or roll of dough, from which the loaf is baked, is severed transversely into a plurality of pieces, and the severed pieces subsequently arranged in the baking tin side by side with their axes extending crosswise of the tin. When these transversely extending pieces are proofed and subsequently baked into the loaf, the pieces merge, or unite, one with the other to form an integral loaf of bread with substantially the same grain throughout the loaf in all directions.

Heretofore, where such process has been employed, the piece or roll of dough discharged by the moulding machine has been severed, usually by a plurality of spaced apart cutters arranged on an axis extending parallel to the axis of the drum of the moulder, and as the severed pieces pass from the cutters, they lie end to end across a conveyor belt. The universal custom is for an operator to gather up the severed pieces of the roll and place them manually in the baking tin.

The present day moulding machines run at comparatively high speeds, discharging around one hundred pieces of dough per minute. Such a moulding machine may be of the type disclosed in Patent No. 1,620,559, March 8, 1927. The rolls or strips of dough are usually discharged from the moulder onto a conveying belt from which the rolls of dough, or the severed pieces, if the rolls are severed, are gathered up manually by an operator, stationed on each side of the conveyor belt, and placed into the baking tins. The rolls of dough are operated upon by the moulder with the axis of the rolls extending parallel to the axis of the moulder drum and accordingly, the rolls are discharged in a position extending transversely of the conveyor belt, and when these rolls are severed into a plurality of pieces, the pieces lie end to end in a row extending transversely of the belt in the same manner as the unsevered roll. This makes it necessary for the operators to pick up each severed piece of the roll and shift it ninety degrees about a vertical axis, and after all the severed pieces of one roll are thus transposed, the operator then, with a sweeping motion of his hands, picks up the transposed pieces and drops them into the baking tin, with the pieces extending transversely of the tin. Due to the fact that the rolls of dough are discharged with such frequency from the moulding machine, it requires two or more extra operators to transpose the severed pieces and then gather them up and put them into the baking tins.

An object of this invention is a dough divider which is operable to automatically sever a roll of dough into a plurality of pieces and discharge the severed pieces upon a conveyor belt with the pieces arranged axially of the belt, whereby the severed pieces may be instantaneously gathered in the hands of the operator and dropped into the baking tin.

Another object of the invention is a machine of the type described provided with means for passing the roll of dough, after it is discharged from the moulding machine, through the cutting means at high velocity, whereby the roll of dough is easily severed by the cutting knives without being distorted or drawn out of shape, and the pieces severed with smooth straight cuts.

A further object of the invention is a dough dividing machine provided with means operable to maintain the roll of dough at a uniform diameter at the time that it is severed into the smaller pieces, whereby each of the severed pieces will contain substantially the same amount of dough.

The invention consists in the novel features and in the combinations and constructions hereinafter set forth and claimed.

In describing this invention, reference is had to the accompanying drawings in which like characters designate corresponding parts in all the views.

Figure 1 is a side elevation of the dough dividing machine and contiguous portion of the moulding machine partly in section.

Figure 2 is a partial plan view of the dough dividing machine and contiguous portion of the moulding machine.

The dough dividing machine comprises generally a suitable frame, a conveyor belt extending lengthwise of the frame, a plurality of spaced apart cutters arranged on a horizontal axis extending transversely above one end of the conveyor belt, means for receiving the rolls of dough discharged by a moulding machine and transferring such rolls to the cutters, and means for arranging each severed piece with its axis extending lengthwise of the conveyor belt.

The machine here shown comprises a suitable frame 10 supported at each end by uprights 11 which serve as legs. A shaft 12 is mounted in suitable bearings 13 at one end of the frame 10 and extends transversely thereof and carries the roller 14. A similar arrangement including shaft 15, bearing 16 and roll 17 is located at the opposite end of the frame, and an endless conveyor belt 20 operates over the rollers 14, 17, the upper run of which is maintained taut by the adjustable roller 21 coacting with the lower run of the belt. The conveyor belt 20 is in continuous motion during operation of the machine, the top run of the belt traveling towards the outer end of the machine, or toward the shaft 15. The conveyor belt is operated by any suitable source of power, such as an electric motor 22 mounted upon lower side rails 23 of the frame.

As here shown, a sprocket 24 is secured to the shaft 15, and a sprocket 25 is mounted upon a shaft 26 extending transversely of the outer end of the frame, and a smaller sprocket 27 is also mounted upon the shaft 26 and rotatable with the large sprocket 25. A suitable chain 29 operates over the sprockets 24, 27, and idling sprockets 30 arranged on the frame. The large sprocket 25 is operatively connected to a sprocket on the motor 22 by a chain 31. It will be understood that any suitable drive may be employed to operate the conveyor belt 20.

The dough dividing machine is particularly useful in combination with a moulding machine 35, which includes a rotatable drum 36, and a compressor plate 37. The portions of dough are introduced between the drum 36 and compressor plate 37, and as the drum 36 revolves a planetary motion is imparted to the rolls 38 of dough as they travel about the drum in contact with the compressor plate 37, all in a manner well known to those skilled in the art. The construction of the moulding machine 35 per se, forms no part of this invention, and as such machines are well known to those familiar with the art, further reference to the same is believed unnecessary.

The inner end of the dough dividing machine, that is the end adjacent the discharge side of the moulder 35, is provided with means for receiving the rolls 38 of dough as they are discharged by the moulder, and to sever the rolls into a plurality of pieces and to arrange the severed pieces side by side with their axes extending lengthwise of the conveyor belt 20.

As here shown, the inner end of the frame is provided at each side with an upright member 40, and also with a bracket member 41. The bracket member 41 consists of a lower brace portion 42 secured to the lower top rail of the frame, as at 43. The brace 42 extends upwardly and rearwardly toward the moulding machine 35, and is then bent upwardly and forwardly over the top of the vertical member 40, to which it is secured, and then downwardly where it is secured to the upper rail of the frame 10, as at 44. The brackets 41 carry bearings 45 in which is rotatably journalled a shaft 46 on which is mounted a roller 47. The dough dividing machine is preferably so arranged, relative to the drum 36, that the intervening space 48, between the peripheries of the drum 36 and the roller 47, is less than the diameter of the rolls 38 of dough.

A larger roller or drum 50 is carried by shaft 51 which is rotatably mounted in bearings 52 carried by the uprights 40, and a sprocket 53 is secured to the shaft 51 to effect rotation of the drum 50. A compressor plate 54 is arranged beneath the large drum 50 in spaced apart relation thereto, and is detachably secured at one end to the compressor plate 37 of the moulding machine 35, as at 55, and the other end suitably supported by the frame 10.

Immediately forward of the large roll 50, a plurality of circular cutters 56 are secured to a shaft 57 which is rotatably mounted in bearings 58 secured to the frame 10 with the axis of the shaft 57 in substantially vertical alinement with the axis of the shaft 12. The cutters 56 are arranged in spaced apart relationship and are rotatable with the shaft 57, to the outer end of which, is secured a sprocket 60. Rotation is imparted to the large roll 50 and the cutters 56 through the chain 61 which operates in engagement with the sprockets 53, 60. The opposite end of the chain loop, not shown, operates on a sprocket carried by the operating mechanism of the moulding machine.

Rotary motion is imparted to the roll 47 through belt 63 operating over a pulley 64 secured to the shaft 51, and a pulley 65 secured to the shaft 46. The object of the roll 47 is to engage the rolls of dough 38 as they pass from between the drum 36 and the compressor plate 37, and to transfer the rolls between the periphery of the roll 50 and the compressor plate 54. The drum 50 is of slightly greater diameter in the center than at the ends, and is thus constructed to exert a greater pressure on the center portion of the roll of dough, as it travels between the drum 50 and the compressor plate 54, to prevent the roll of dough from contracting lengthwise. Immediately after the roll of dough 38 passes from between the drum 36 and the compressor plate 37, it has a tendency to contract lengthwise and become thickened in the center. This action is prevented by the drum 50, and the roll of dough, as it is discharged against the cutters 56, is of uniform diameter throughout, whereby each of the subsequently severed pieces contain an equal amount of dough.

Because of the comparatively large diameter of the drum 50, the rolls 38 of dough are accelerated to a high velocity against the cutters 56 which, together with the drum 50, are rotated in a clockwise direction Figure 1. The rolls of dough are not conveyed under the cutters 56 by the conveyor belt 20, as is the usual case in dough dividing machines, but are rather projected against and through the cutters 56 at high velocity by the roll 50. The rolls of dough 38 are thus severed instantaneously and without any squashing down or deformation of the roll and the ends of the severed portions are formed with a straight even cut.

Preferably, the shaft 51 is so located relative to the upper run of the conveyor belt 20 that the lower side of the drum 50 is located in the same plane as the upper run of the belt. As previously stated, the cutters 56 are arranged just above the upper run of the belt and adjacent the rear end thereof, all whereby the rolls of dough 38 are discharged from between the drum 50 and the compressor plate 54 tangentially against the cutters 56. The drum 50 is preferably located as close to the cutters 56 as possible so that the roll 38 of dough is severed substantially simultaneously as it leaves contact with the drum 50 and compressor plate 54, whereby the dough is not permitted to contract or draw out of shape.

The dough dividing machine is equipped with means for transposing the transversely extending severed pieces to a position where they are conveyed by the conveyor belt 20 with the axes of the severed pieces extending lengthwise of the conveyor belt.

As here shown, a bar 65 extends transversely of the conveyor belt immediately forward of the cutters 56 and is secured at its ends to the upper portion of the brackets 41, as at 66. The bar 65 acts as a support for a plurality of guides 67, there being one guide for each severed piece 68 of dough. The guides 67 are arranged just above the conveyor belt 20 and extend rearwardly toward the shaft 57, the rear portion 69 being arcuate and the forward portion extending substantially parallel with the side edges of the belt 20. The guides 67 are arranged along the bar 65 with the same relative spacing as the cutters 56 on the shaft 57, there being, as previously stated, a guide for each severed piece of dough.

In operation, as the roll of dough 38 passes through the cutters 56, like ends of the severed portions contact the rear arcuate portion 69 of the guides 67, and as the severed pieces 68 are moved forwardly by the conveyor belt 20, the opposite ends are swung about an arc, as indicated by dotted line position Figure 2, with the result that the severed pieces 68 assume a position with their axes extending lengthwise of the conveyor belt 20. It will be understood that the conveyor belt 20 is operated at a speed sufficient to transfer the groups of severed pieces 68 away from the cutters 56 before the succeeding roll of dough 38 is passed through the cutters.

It will be understood that the roll 47, drum 50 and cutters 56 may be all operated by the motor 22 by arranging the proper drive connection between the chain 61 and the motor, in any well known manner.

The machine here described is particularly suitable to use in combination with dough moulding machines commonly used in bakeries. The machine is of light weight and can be readily set up to the dough moulder, or removed when it is not desired to produce severed rolls. It will be fully appreciated that the particular features of construction herein described are set forth merely as an embodiment of our invention and which may be changed, or modified appreciably without departing from the scope or substance of our invention.

What we claim is:—

1. A machine for dividing a roll of dough into a plurality of pieces, including a suitable frame, a pair of spaced apart rollers journalled in said frame, an endless conveyor belt operable about said rolls, a plurality of spaced apart cutters mounted on the frame above the plane of the upper run of said belt, means for transferring the roll of dough through said cutters with the axis of the roll extending transversely of the conveyor belt, and means for arranging the severed pieces side by side with their respective axis extending lengthwise of the said belt.

2. A machine for dividing a roll of dough into a plurality of pieces, including a suitable frame, a roller journalled in each end of the frame, and an endless conveyor belt operable over said rollers, a shaft rotatably journalled in the frame and extending transversely of the upper run of said conveyor belt, a plurality of cutters arranged in spaced apart relationship upon said shaft, means operable to convey a roll of dough against said cutters to effect severance of the same, and means cooperable with said conveyor belt to arrange the severed pieces side by side with their axis extending lengthwise of said belt.

3. A machine for dividing a roll of dough into a plurality of pieces, including a suitable frame, a roller journalled in each end of the frame, and an endless conveyor belt operable over said rollers, a shaft rotatably mounted on the frame above the upper run of said conveyor belt and at one end thereof, a plurality of guide members arranged in spaced apart relation across the upper run of the belt, said guide members having rearwardly extending arcuate portions terminating adjacent said cutters and being formed with a forwardly extending straight portion, a drum rotatably journalled in the frame on the opposite side of said cutter shaft, a compressor plate arranged beneath the drum and cooperable with said drum to discharge the rolls of dough against said cutters upon rotation of said drum, and means for effecting rotation of said cutters and said drum.

4. A machine for dividing a roll of dough into a plurality of pieces including a suitable frame, a pair of rollers rotatably journalled in the frame in spaced apart relationship, an endless conveyor belt arranged to run over said rollers, a plurality of cutters arranged in spaced apart relationship on an axis extending transversely of the upper run of the belt with the periphery of the cutters adjacent thereto, a drum rotatably mounted at the end of the frame adjacent said cutters, a compressor plate located below said drum and being cooperable with said drum to discharge the rolls of dough between said cutters and the upper run of said belt, and means for actuating said drum at high peripheral speed and for operating said belt.

5. A machine for dividing a roll of dough into a plurality of pieces including a suitable frame, a roller rotatably mounted in the frame, a compressor plate supported by the frame, said plate being arcuate to conform to the periphery of said roller and arranged in spaced apart relationship thereto, cutting mechanism including a plurality of cutters arranged in spaced apart relationship on said frame, the discharge end of said compressor plate terminating at a distance from said cutting mechanism, and said roll and compressor plate being arranged to receive the rows of dough and discharge the same into said cutting mechanism at high velocity to effect severance of the roll into a plurality of pieces arranged end to end without changing the condition of the dough, and means for rotating said roll at high peripheral speed to effect such discharge.

6. A machine for dividing rolls of dough into a plurality of pieces comprising a frame, cutting means including a plurality of spaced apart cutters mounted on the frame and operable to sever the rolls of dough into groups of separate pieces arranged in end to end relationship, a conveyor mounted on the frame arranged to receive the groups of severed pieces and operable to convey the same from said cutting means, a plurality of guide members carried by the frame adjacent the respective cutters and arranged in the path of movement of the respective severed pieces while being conveyed by said conveyor, and being operable to rearrange the pieces of each group in side by side relationship on said conveyor.

JOSEPH C. MENAPACE.
GEORGE KALLFELZ.